United States Patent [19]
Kusner

[11] Patent Number: 5,343,921
[45] Date of Patent: Sep. 6, 1994

[54] TIRE IRON FOR TUBELESS TRUCK TIRES

[75] Inventor: John D. Kusner, Lyndhurst, Ohio

[73] Assignee: Ken-Tool, Akron, Ohio

[21] Appl. No.: 68,278

[22] Filed: May 27, 1993

Related U.S. Application Data

[63] Continuation of Ser. No. 818,776, Jan. 13, 1992, abandoned.

[51] Int. Cl.5 .............................................. B60C 25/02
[52] U.S. Cl. ................................................. 157/1.3
[58] Field of Search .................. 81/1.3; 76/101.1, 119; 72/377

[56] References Cited

U.S. PATENT DOCUMENTS

| | | | |
|---|---|---|---|
| D. 134,799 | 1/1943 | Taylor | 157/1.3 |
| D. 163,385 | 5/1951 | Hawes | D8/89 |
| D. 264,043 | 4/1982 | Edwards | D8/89 |
| 2,188,211 | 1/1940 | Tilson | 157/1.3 |
| 2,226,757 | 12/1940 | Ewell | 157/1.3 |
| 2,311,789 | 2/1943 | Taylor | 157/1.3 |
| 2,344,704 | 3/1944 | Krantz | 157/1.3 |
| 3,940,969 | 3/1976 | Princehouse | 72/377 X |
| 4,919,184 | 4/1990 | du Quesne | 157/1.3 |

Primary Examiner—D. S. Meislin
Attorney, Agent, or Firm—Lackenbach Siegel Marzullo Aronson & Greenspan

[57] ABSTRACT

Tire tool of the tire iron type formed entirely by forging from previously unforged steel bar stock having a reverse curved centifuration and depending integral elements formed only by forging operations.

5 Claims, 4 Drawing Sheets

FIG. 1a
PRIOR ART
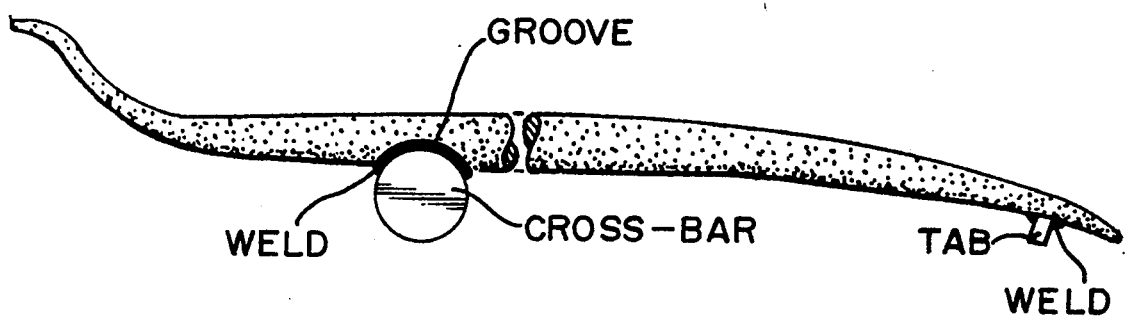
FIG. 1b
PRIOR ART
FIG. 1c
PRIOR ART

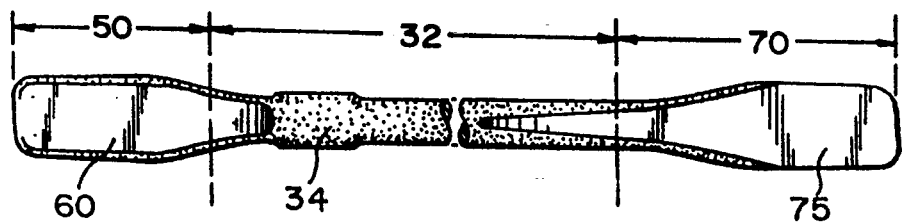
FIG. 2a
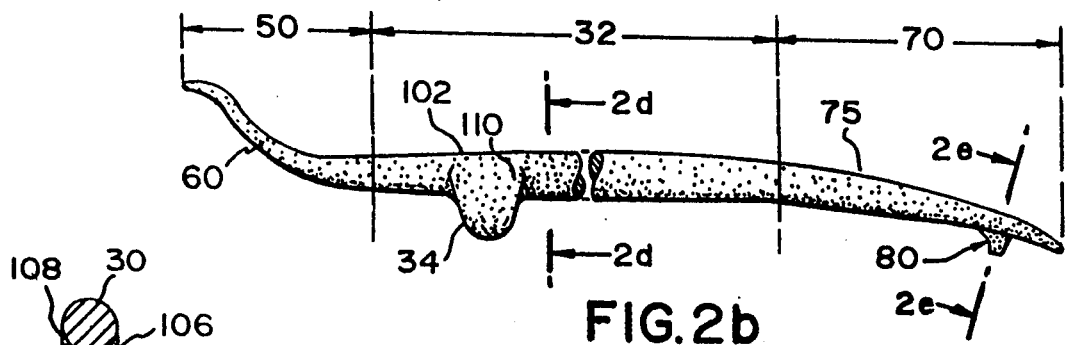
FIG. 2b
FIG. 2d
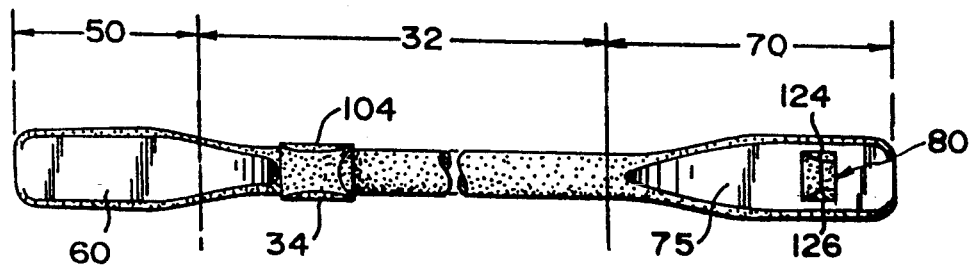
FIG. 2c
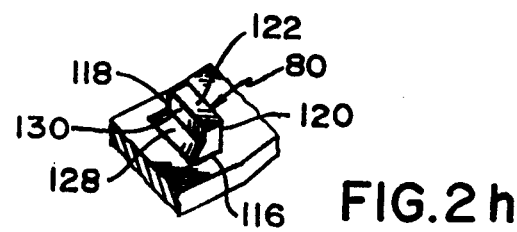
FIG. 2h
FIG. 2f
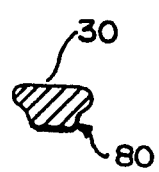
FIG. 2e
FIG. 2g

5,343,921

TIRE IRON FOR TUBELESS TRUCK TIRES

This application is a continuation of application Ser. No. 818,776, filed Jan. 13, 1992 now abandoned.

The present invention relates to tire tools. More particularly, the present invention is directed to a tire iron suited for removing tubeless truck tires from rims.

BACKGROUND OF THE INVENTION

Tire tools, i.e. tire irons for removing tires from rims are widely known and described in U.S. Pat. Nos. 2,344,704-E. G. Krantz and 2,311,789-I. M. Taylor. A currently used tire iron for removing tubeless truck tires from wheel rims is shown in FIGS. 1(a)-1(c) -prior art. This tire iron is made from steel bar stock and is forged to shape and bent at its opposite forge-tapered ends and also grooved to receive and be joined by welding to a steel separate steel cross-piece bar. A tab is also welded adjacent a tapered end of the tire iron. These welded elements are very useful in tire removal situations as is well known, e.g. as locating/pounding and lever bearing surfaces. However, the use of both the forging and welding operations in fabricating the tire iron is time consuming and expensive and results in a non-homogeneous implement which has various differences in mechanical properties, some of which are introduced by the welding technique employed, requiring additional inspection and handling.

It is an object of the present invention to provide a tire iron which is structurally homogeneous and in the form of a single hot worked integral tire iron tool.

SUMMARY OF THE INVENTION

The present invention is a tire iron type tool which is formed entirely from a single piece of straight steel bar stock which has not previously been exposed to forging conditions, i.e. hammering or pressing. An integral knob-shaped element is formed in the bar between the ends thereof by upset forging at an intermediate location. The knob-shaped element is configured to depend from the bar. At a first end of the bar, usually the end closest to the previously formed knob, and a curve-bent flat forged termination is formed by forging and bending. At the other, second, end of the bar, a press forged and curve-bent termination is formed having an integral depending pad element formed in the flattened and curve-bent termination.

BRIEF DESCRIPTION OF THE DRAWINGS

FIGS. 1(a)-1(c) show top, side and bottom views of a prior art tire tool;

FIGS. 2(a)-2(h) show top, side and bottom views of the tire tool of the present invention and sectional and end views thereof;

DETAILED DESCRIPTION OF THE INVENTION

Figure 3A:
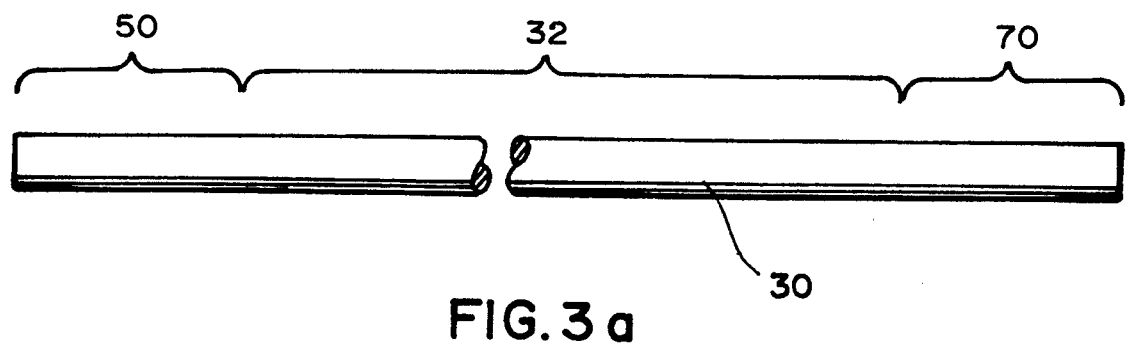
FIG. 3(a)-3(b) show a piece of steel bar stock as used in the present invention.
Figure 3B:
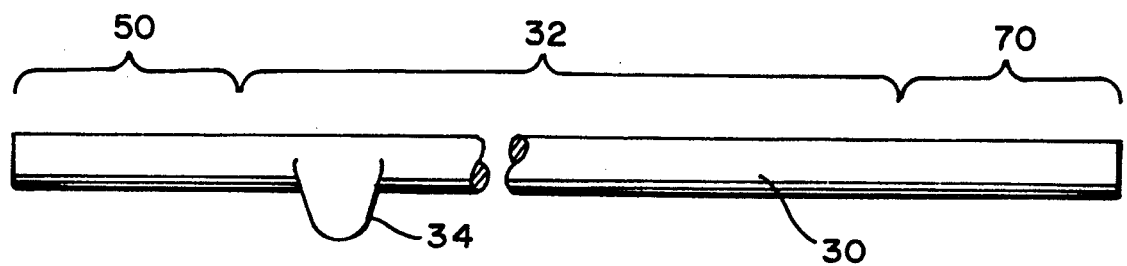

With reference to FIGS. 1(a)-1(c) which show a currently commercial prior art tire tool, the indicated welding and grooving increases the time and cost of fabrication and also interrupts the fibering of the bar stock which leads to non-homogeneous mechanical properties. In the present invention, with reference to FIGS. 2(a)-2(h), the tire tool 10 is formed from a piece of previously unforged, (i.e. not hammered or pressed) steel bar stock illustrated at 30 in FIG. 3(a). The straight piece of steel bar stock 30 is subjected to upset forging at its intermediate portion 32 to form the knob-like, depending protrusion 34 which corresponds in function to the welded cross bar illustrated in the prior art device of FIG. 1 . The upsetting operation involved heating the intermediate portion 32 of the piece of bar stock 30 to a temperature of above 1550 degrees F. in an open top gas fired slot furnace. For a typical bar stock of alloy steel for example 4140 HR alloy with a diameter of ¾1 inch, an increment of about 6 inches of the length of the bar stock is brought to forging temperature. When at temperature the bar stock is installed in an upsetter (suitably a commercial National 2" Upsetter). The upsetter is a pressing machine in which the piece is clamped between two dies with vertical faces and shaped by the operation of a ram which operates with a horizontal stroke with axial flow and compression of metal.

Figure 4:
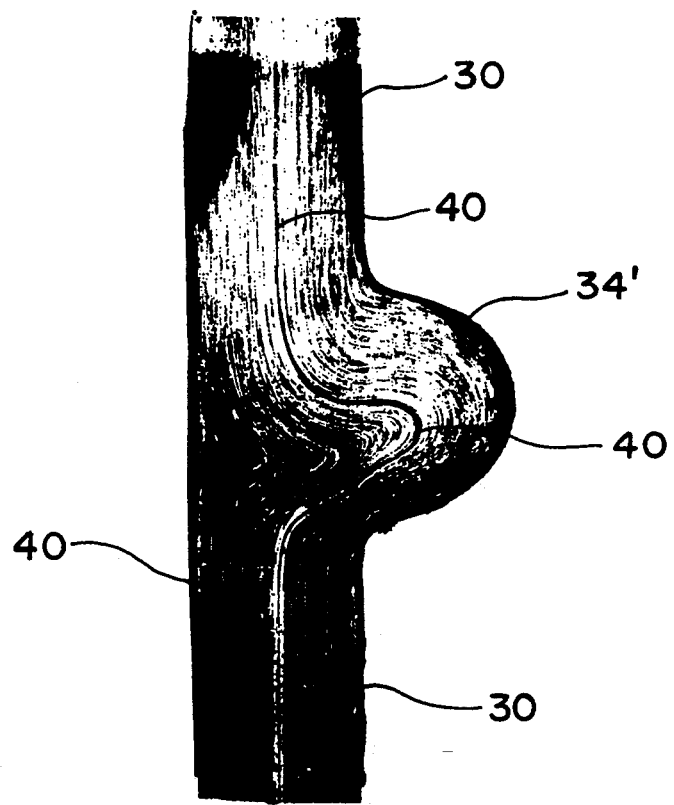

In the practice of the present invention the upsetting operation is accomplished in one strike (stroke) and results in the axially compressed metal mass 34' shown in FIG. 4. FIG. 4 is a 1 to 1 scale macro-photograph etched (HCL+H2O) longitudinal section showing the fibers 40 of bar 30 which resulted from the unidirectional rolling of the bar stock in the course of its manufacture. Interruption and breaking of the fibers can indicate the presence of a defect. As can be seen in FIG. 4, the fibers 40 of bar stock piece 30 are essentially unbroken and uninterrupted by the upsetting operation at knob 34' and the mechanical properties have not been significantly changed. Subsequent to the aforedescribed upsetting operation the first end portion 50, the end nearest the knob 40, is heated to the forging temperature in an open slot furnace over a length of about 5 inches and this end portion is forged flat and bent by hammering, for example using a conventional Bradley Hammer with open dies, i.e. the anvil and hammer frames are separately mounted. The first end portion 50 of bar 30 is drawn out and flattened and bent by repeated hammer blows to achieve the curved configuration shown at 60 in FIGS. 2(a)-(2c) and end portion 50 is trimmed to shape as required.

FIGS. 2(a),2(b),2(c),2(d), etc. illustrate the configuration of the integral knob element 34 and show that it extends outwardly in the vicinity of a junction between the first end and the intermediate portion. The integral knob element comprises a top semi-cylindrical part 102, engaging part 104, and two side walls 106 and 108, connecting the top part to the engaging part. The top part has a longitudinal axis which is substantially parallel to a longitudinal axis of the intermediate portion, so that the top semi-cylindrical part extends along the semi-cylindrical intermediate portion. The side walls are connected to the top part by a connecting means 110 for providing smooth and gradual transition between the elements.

End portion 70 is next heated to the forging temperature in an open slot furnace along a length of about 7 inches and press-forged in closed dies operation (hammer and anvil are part of the same structure) for example in a commercial Natural Maxi-Press (700 ton) forging machine. The die design results in the flattening and bending of end portion 70 as indicated at 75 and the concurrent formation of a generally trapezoidal pad element 80. The required trimming is provided.

The integral depending pad element 80 is clearly illustrated in at least FIGS. 2(b),2(c),2(h), etc. These Figures depict that the integral depending pad element 80 consists of a base 116, a front portion 118 facing the integral knob element, a rear portion 120, an engaging surface 122, and two side surfaces 124 and 126. As illustrated in FIG. 2(h), the front portion might consist of first 128 and second 130 members interposed to each other at an obtuse angle. The front portion connects the base to the engaging surface in such a manner that an acute angle is formed between the base and the first member.

With respect to the end 50 nearest the knob 40, it will also be appreciated that it is possible to press forge this end in a manner similar to that of the end portion 70 so that neither end of the article is formed by a hammering process.

Figure 5:
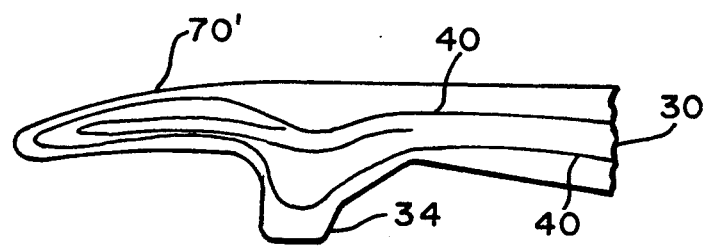
FIGS. 4 and 5 are macro-photographs (1 to 1 scale) of longitudinal sections of portions of the tire tool of the present invention.

As shown in FIG. 5, which is a 1 to 1 scale macrophotograph of a longitudinal, etched (Nital) section of end portion 70, the fibers 40 of bar stock piece 30 are essentially unbroken and uninterrupted by the pressing and bending of end portion 70 and thus the mechanical properties have not been significantly changed. Following the aforedescribed forging operations, the article is subjected to conventional grinding and finishing to provide the tire tool shown in FIGS. 2(a)-(h).

The individual forging operations and apparatus or machines described above are well known in the art and are described in "The Making Shaping and Treating of Steel" - United States Steel Corporation - 7th Edition (Pittsburgh, 1957) and "Metals Handbook" - American Society for Metals (Cleveland, 1948). The bar stock used in the making of the tool of the present invention includes other similar alloy steels.

It is to be understood that the foregoing description and specific embodiments are merely illustrative of the best mode of the invention and the principles thereof, and that various modifications and additions may be made to the device by those skilled in the art, without departing form the spirit and scope of this invention, which is therefore understood to be limited only by the scope of the appended claims.

What is claimed is:

1. A tire iron, comprising:

an elongated body having first and second end portions, an intermediate portion having a substantially cylindrical configuration and extending between said first and second end portions, said intermediate portion further including upper and lower surfaces;

an integral knob element, said integral knob element extending outwardly from said intermediate portions, said integral knob element comprising a top semi-cylindrical part, an engaging part and two side walls connecting said top part to the engaging part, said top-semi-cylindrical part having a longitudinal axis being substantially parallel to a longitudinal axis of said intermediate portion, so that said top substantially cylindrical part extends along said semi-cylindrical intermediate portion, said side walls being connected to said top part by connecting means for providing a smooth and gradual transition between said side walls and said top part, so that an integral, homogeneous structure is formed by said intermediate portion and said integral knob element;

said second end portion having top and bottom parts, an integral depending pad element extending outwardly from said bottom part, said integral depending pad element having a base, a front portion facing said integral knob element, a rear portion, an engaging surface and two side surfaces, said side surfaces connecting said base to said engaging surface; and said front portion consisting of first and second members interposed to each other at an obtuse angle, said front portion connecting said base to said engaging surface in such a manner that an acute angle is formed between said base and said first member.

2. A tire iron of claim 1, wherein said first and second members and said side surfaces have substantially flat configuration.

3. A tire iron of claim 1, wherein said rear portion is positioned to said base at an acute angle.

4. A tire iron of claim 2, wherein said integral depending pad element is connected to said bottom part of said second end portion through said base.

5. A tire iron of claim 4, wherein said integral depending pad element has a generally trapezoidal configuration.

* * * * *